United States Patent
Chen

(10) Patent No.: US 9,842,523 B2
(45) Date of Patent: Dec. 12, 2017

(54) METHOD OF MONITORING QUALITY OF LIQUID CRYSTAL DISPLAY PANEL

(71) Applicant: Shenzhen China Star Optoelectronics Technology Co., Ltd., Shenzhen, Guangdong (CN)

(72) Inventor: Lixuan Chen, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 296 days.

(21) Appl. No.: 14/437,927

(22) PCT Filed: Jan. 16, 2015

(86) PCT No.: PCT/CN2015/070832
§ 371 (c)(1),
(2) Date: Apr. 23, 2015

(87) PCT Pub. No.: WO2016/106862
PCT Pub. Date: Jul. 7, 2016

(65) Prior Publication Data
US 2017/0140685 A1    May 18, 2017

(30) Foreign Application Priority Data
Dec. 31, 2014    (CN) .......................... 2014 1 0854048

(51) Int. Cl.
*G09G 3/00*    (2006.01)
*G09G 3/36*    (2006.01)
*G02F 1/13*    (2006.01)

(52) U.S. Cl.
CPC .......... *G09G 3/006* (2013.01); *G02F 1/1309* (2013.01); *G09G 3/36* (2013.01); *G02F 2203/69* (2013.01); *G09G 2330/12* (2013.01)

(58) Field of Classification Search
CPC .............................. G09G 3/006; G02F 1/1309
See application file for complete search history.

(56) References Cited

U.S. PATENT DOCUMENTS

| | | | | |
|---|---|---|---|---|
| 5,204,617 A * | 4/1993 | Kumagai | ............... | G02F 1/1309 324/73.1 |
| 5,638,461 A * | 6/1997 | Fridge | .................... | G01N 21/88 348/190 |
| 5,650,844 A * | 7/1997 | Aoki | ..................... | H04N 17/04 348/180 |
| 5,764,209 A * | 6/1998 | Hawthorne | ......... | G06F 11/2221 345/87 |

(Continued)

*Primary Examiner* — Nicholas Lee
*Assistant Examiner* — Robert Stone
(74) *Attorney, Agent, or Firm* — Andrew C. Cheng

(57) ABSTRACT

The invention provides a method of monitoring a quality of a liquid crystal display including: selecting multiple quality parameters related to the quality of the liquid crystal display and obtaining an expression of the quality with respect to the quality parameters; acquiring a value of each of the quality parameters and substituting the value of each of the quality parameters into the expression of the quality with respect to the quality parameters to obtain a first value; judging the first value whether falls into a predetermined range; and when the first value falls into the predetermined range, determining the quality of the liquid crystal display as normal.

7 Claims, 1 Drawing Sheet

(56) References Cited

U.S. PATENT DOCUMENTS

| | | | | |
|---|---|---|---|---|
| 5,785,890 A * | 7/1998 | Yamashita | ............ | C09K 19/34 |
| | | | | 252/299.61 |
| 5,917,935 A * | 6/1999 | Hawthorne | ........... | G02F 1/1303 |
| | | | | 348/126 |
| 6,262,589 B1 * | 7/2001 | Tamukai | ............ | G01R 27/2605 |
| | | | | 324/681 |
| 6,600,468 B1 * | 7/2003 | Kim | ....................... | H04N 17/04 |
| | | | | 324/760.01 |
| 6,606,116 B1 * | 8/2003 | Poynter | .................. | G09G 3/006 |
| | | | | 345/173 |
| 6,616,759 B2 * | 9/2003 | Tanaka | ................ | G05B 13/048 |
| | | | | 118/63 |
| 2001/0038385 A1 * | 11/2001 | Negoi | ....................... | G09G 3/36 |
| | | | | 345/204 |
| 2002/0118878 A1 * | 8/2002 | Tanahashi | ............ | G06T 7/0002 |
| | | | | 382/181 |
| 2002/0163963 A1 * | 11/2002 | Moote | ..................... | H04B 1/66 |
| | | | | 375/240 |
| 2003/0113007 A1 * | 6/2003 | Iwasaki | ................ | G02F 1/1309 |
| | | | | 382/141 |
| 2005/0288812 A1 * | 12/2005 | Cheng | ............. | G05B 19/41875 |
| | | | | 700/109 |
| 2009/0009741 A1 * | 1/2009 | Okita | .................. | G03F 7/70516 |
| | | | | 355/53 |
| 2012/0026315 A1 * | 2/2012 | Lee | ........................ | G09G 3/006 |
| | | | | 348/92 |
| 2014/0198984 A1 * | 7/2014 | Chen | ........................ | G06T 7/001 |
| | | | | 382/167 |
| 2014/0198994 A1 * | 7/2014 | Chen | .................... | G06T 7/0002 |
| | | | | 382/279 |
| 2014/0218411 A1 * | 8/2014 | Chen | ................... | G09G 3/3611 |
| | | | | 345/690 |

* cited by examiner

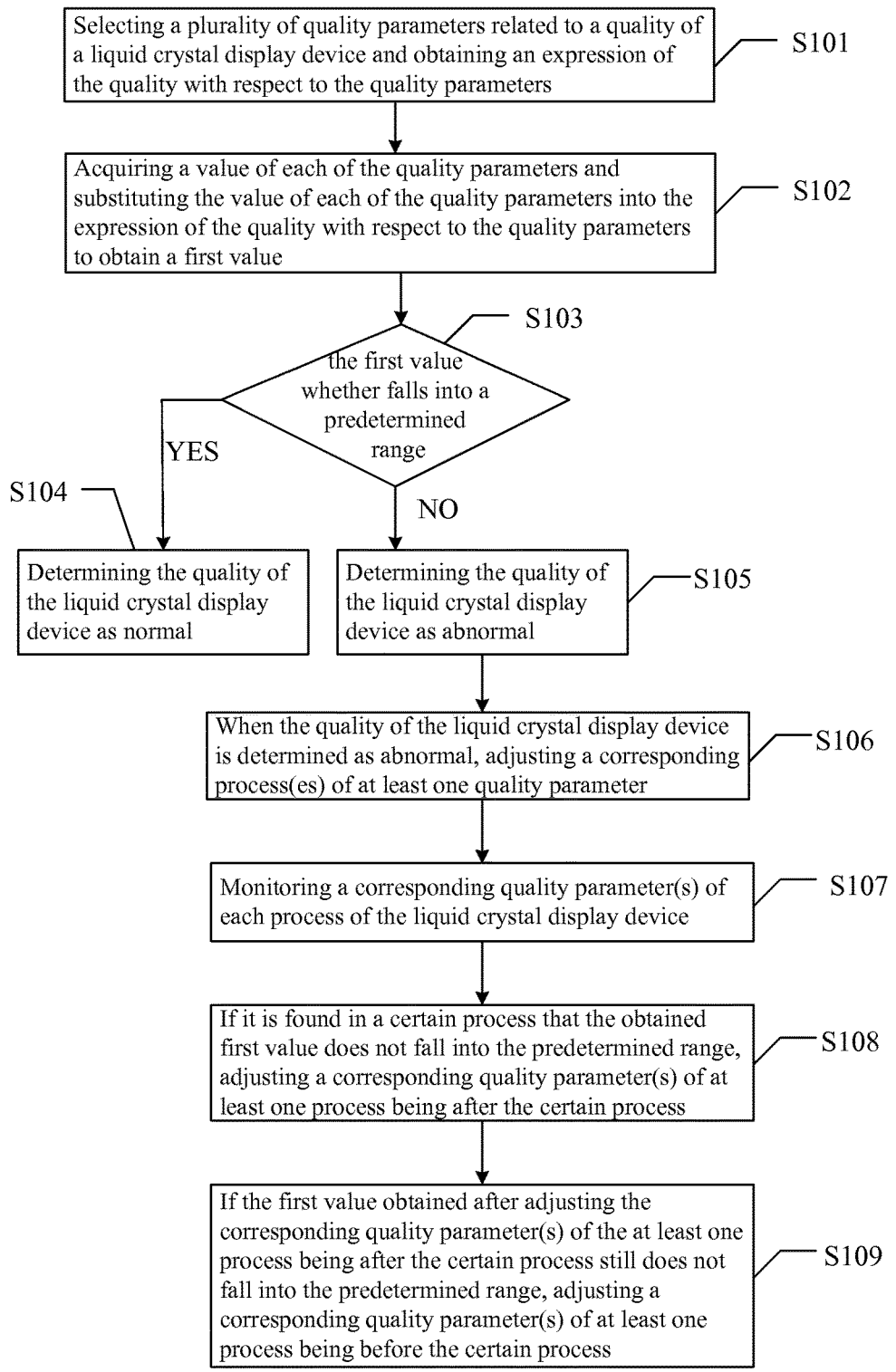

METHOD OF MONITORING QUALITY OF LIQUID CRYSTAL DISPLAY PANEL

CROSS REFERENCE TO RELATED APPLICATION

This application claims the priority of Chinese Patent Application No. 201410854048.9, entitled "Method of monitoring quality of liquid crystal display panel", filed on Dec. 31, 2014, the disclosure of which is incorporated herein by reference in its entirety.

BACKGROUND OF THE INVENTION

1. Field of the Invention

The invention relates to the field of display technology, and particularly to a method of monitoring a quality of liquid crystal display panel.

2. Description of Related Art

The liquid crystal display (LCD) is a commonly used electronic device, and because of its low power consumption, small size, light weight and other characteristics, it is quite popular for users. During the production process of liquid crystal display panel, several processes are needed, such as an array substrate process and a color filter substrate process. Quality parameters in the various processes would have impact on the quality (e.g., Gamma value, contrast ratio or transmittance) of the liquid crystal display panel. The quality parameters in all the processes finally would determine the quality (good or bad) of the liquid crystal display panel. However, in the prior art, the quality of the liquid crystal display would not be well monitored.

SUMMARY OF THE INVENTION

Accordingly, the invention provides a method of monitoring a quality of a liquid crystal display. The method of monitoring a quality of a liquid crystal display includes: selecting a plurality of quality parameters related to the quality of the liquid crystal display and obtaining an expression of the quality with respect to the plurality of quality parameters; acquiring a value of each of the quality parameters and substituting the value of each of the quality parameters into the expression of the quality with respect to the plurality of quality parameters to obtain a first value; judging the first value whether falls into a predetermined range; and when the first value falls into the predetermined range, determining the quality of the liquid crystal display as normal.

In an exemplary embodiment, the method of monitoring a quality of a liquid crystal display further includes: when the first value does not fall into the predetermined range, determining the quality of the liquid crystal display as abnormal.

In an exemplary embodiment, the method of monitoring a quality of a liquid crystal display further includes: when the quality of the liquid crystal display is determined as abnormal, adjusting a corresponding process(es) of at least one quality parameter.

In an exemplary embodiment, the method of monitoring a quality of a liquid crystal display further includes: monitoring a corresponding quality parameter(s) of each process of the liquid crystal display; and if it is found in a certain process that the finally obtained first value does not fall into the predetermined range, adjusting a corresponding quality parameter(s) of at least one process being after the certain process.

In an exemplary embodiment, the method of monitoring a quality of a liquid crystal display further includes: when the first value obtained after adjusting the corresponding quality parameter(s) of the at least one process being after the certain process still does not fall into the predetermined range, adjusting a corresponding quality parameter(s) of at least one process being before the certain process.

In an exemplary embodiment, the step of selecting a plurality of quality parameters related to the quality of the liquid crystal display and obtaining an expression of the quality with respect to the plurality of quality parameters uses a least square method to obtain the expression of the quality with respect to the plurality of quality parameters.

In an exemplary embodiment, the quality of the liquid crystal display includes Gamma value, contrast ratio or transmittance of the liquid crystal display.

In an exemplary embodiment, the quality parameters of the liquid crystal display includes one of thickness of alignment film, temperature of alignment film, distance between pixel electrodes, thickness of pixel electrode, interval between a color filter substrate and a thin film transistor array substrate, applied voltage of liquid crystal panel, brightness of liquid crystal panel and mass of liquid crystal, or a combination of at least one thereof.

Compared with the prior art, the method of monitoring a quality of a liquid crystal display of the invention selects a plurality of quality parameters related to the quality of the liquid crystal display, obtains an expression of the quality with respect to each of the quality parameters, obtains a value of each of the quality parameters and substitutes the value of each of the quality parameters into the expression associated with the plurality of quality parameters to obtain a first value. When the first value falls into a predetermined range, the quality of the liquid crystal display is determined as normal. Therefore, the method of monitoring a quality of a liquid crystal display of the invention can monitor the quality of the liquid crystal display and thus can avoid adverse/bad product to some extent.

BRIEF DESCRIPTION OF THE DRAWING

In order to more clearly illustrate the technical solution of an embodiment of the invention, a drawing will be used in the description of an embodiment will be given a brief description below. Apparently, the drawing in the following description only is some of embodiments of the invention, the ordinary skill in the art can obtain other drawings according to these illustrated drawing without creative effort.

FIG. 1 is flowchart of a method of monitoring a quality of a liquid crystal display according to a preferred embodiment of the invention.

DETAILED DESCRIPTION OF THE PREFERRED EMBODIMENT

In the following, with reference to accompanying drawing of an embodiment of the invention, a technical solution in the embodiment of the invention will be clearly and completely described. Apparently, the embodiment of the invention described below only are a part of embodiments of the invention, but not all embodiments. Based on the described embodiment of the invention, all other embodiments obtained by ordinary skill in the art without creative effort belong to the scope of protection of the invention.

Referring to FIG. 1, which is a flowchart of a method of monitoring a quality of a liquid crystal display. In particular, the method of monitoring a quality of a liquid crystal display is used for monitoring parameters in various processes of manufacturing the liquid crystal display and determining the quality of the finally obtained liquid crystal display whether is normal or not. The method of monitoring a quality of a liquid crystal display includes but is not limited to the following steps. The numbers of the following steps are not intended to limit the actual monitoring sequence of the invention.

Step S101: selecting a plurality of quality parameters related to a quality of a liquid crystal display and obtaining an expression of the quality with respect to the quality parameters. The step S101 of selecting a plurality of quality parameters related to a quality of a liquid crystal display and obtaining an expression of the quality with respect to the quality parameters concretely uses a least square method (LSM) to obtain the expression of the quality with respect to the plurality of quality parameters. The quality of the liquid crystal display includes Gamma value, contrast ratio or transmittance, etc. of the liquid crystal display. The quality parameters of the liquid crystal display include one of thickness of alignment film, temperature of alignment film, distance between pixel electrodes, thickness of pixel electrode, interval between a color filter substrate and a thin film transistor (TFT) array substrate, applied voltage of liquid crystal panel, brightness of liquid crystal panel and mass of liquid crystal, or a combination of at least one thereof. In the following, the quality of the liquid crystal display being the Gamma value of the liquid crystal display is taken as an example to illustrate the method of monitoring a quality of a liquid crystal display. The number of quality parameters related to Gamma of the liquid crystal display being four is taken as an example for the purpose of illustration, and the four related quality parameters are named as A, B, C and D. An expression of Gamma of the liquid crystal display with respect to the quality parameters A, B, C and D is that: S=a*A+b*B+c*C+d*D, where a, b, c and d are coefficients. By using multiple (i.e., more than one) sets of quality parameters A, B, C, D and S to obtain the coefficients a, b, c and d, the expression of Gamma of the liquid crystal display with respect to the quality parameters A, B, C and D can be obtained consequently.

Step S102: acquiring a value of each of the quality parameters and substituting the value of each of the quality parameters into the expression of the quality with respect to the quality parameters to obtain a first value.

Step S103: judging the first value whether falls into a predetermined range. The predetermined range represents criteria of the liquid crystal display whether being normal or not. When the first value falls into the predetermined range, the quality of the liquid crystal display is normal; whereas when the first value does not fall into the predetermined range, the quality of the liquid crystal display is abnormal.

Step S104: when the first value falls into the predetermined range, determining the quality of the liquid crystal display as normal.

Step S105: when the first value does not fall into the predetermined range, determining the quality of the liquid crystal display as abnormal.

Step S106: when the quality of the liquid crystal display is determined as abnormal, adjusting a corresponding process(es) of at least one quality parameter.

The method of monitoring a quality of a liquid crystal display further includes the following steps.

Step S107: monitoring a corresponding quality parameter(s) of each process of the liquid crystal display.

Step S108: if it is found in a certain process that the first value does not fall into the predetermined range, adjusting a corresponding quality parameter(s) of at least one process being after the certain process. By using the step S108 to adjust the quality parameter(s) in other process(es) being after the certain process, the quality of the liquid crystal display may be adjusted to be normal.

Step S109: when the first value obtained after adjusting the corresponding quality parameter(s) of the at least one process being after the certain process still does not fall into the predetermined range, adjusting a corresponding quality parameter(s) of at least one process being before the certain process. By using the step S109 to adjust the front process(s) among all the processes of the liquid crystal display, the quality of the liquid crystal display may be made to be good.

Compared with the prior art, the method of monitoring a quality of a liquid crystal display of the invention selects a plurality of quality parameters related to the quality of the liquid crystal display, obtains an expression of the quality with respect to each of the quality parameters, acquires a value of each of the quality parameter and then substitutes the value of each of the quality parameters into the expression associated with the quality parameters to obtain a first value. When the first value falls into a predetermined range, determines the quality of the liquid crystal display as normal. Therefore, the method of monitoring a quality of a liquid crystal display of the invention can monitor the quality of the liquid crystal display and thus can avoid adverse/bad product to some extent.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method of monitoring a quality of a liquid crystal display, comprising:

selecting a plurality of quality parameters related to the quality of the liquid crystal display and obtaining an expression of the quality with respect to the plurality of quality parameters;

acquiring a value of each of the plurality of quality parameters and substituting the value of each of the plurality of quality parameters into the expression of the quality with respect to the plurality of quality parameters to obtain a first value;

judging whether the first value falls into a predetermined range;

when the first value falls into the predetermined range, determining the quality of the liquid crystal display as normal;

monitoring a corresponding quality parameter(s) of each process of the liquid crystal display;

if it is found in a certain process that finally obtained first value does not fall into the predetermined range, adjusting a corresponding quality parameter(s) of at least one process being after the certain process.

2. The method of monitoring a quality of a liquid crystal display as claimed in claim 1, further comprising:

when the first value does not fall into the predetermined range, determining the quality of the liquid crystal display as abnormal.

3. The method of monitoring a quality of a liquid crystal display as claimed in claim 2, further comprising:
when the quality of the liquid crystal display is determined as abnormal, adjusting a corresponding process(es) of at least one of the plurality of quality parameters.

4. The method of monitoring a quality of a liquid crystal display as claimed in claim 1, further comprising:
when the first value obtained after adjusting the corresponding quality parameter(s) of the at least one process being after the certain process still does not fall into the predetermined range, adjusting a corresponding quality parameter(s) of at least one process being before the certain process.

5. The method of monitoring a quality of a liquid crystal display as claimed in claim 1, wherein the step of selecting a plurality of quality parameters related to the quality of the liquid crystal display and obtaining an expression of the quality with respect to the plurality of quality parameters uses a least square method to obtain the expression of the quality with respect to the plurality of quality parameters.

6. The method of monitoring a quality of a liquid crystal display as claimed in claim 1, wherein the quality of the liquid crystal display comprises Gamma value, contrast ratio or transmittance of the liquid crystal display.

7. The method of monitoring a quality of a liquid crystal display as claimed in claim 1, wherein the plurality of quality parameters of the liquid crystal display comprise one of thickness of alignment film, temperature of alignment film, distance between pixel electrodes, thickness of pixel electrode, interval between a color filter substrate and a thin film transistor array substrate, applied voltage of liquid crystal panel, brightness of liquid crystal panel and mass of liquid crystal, or a combination of at least one thereof.

* * * * *